United States Patent [19]
Koo

[11] Patent Number: 5,715,123
[45] Date of Patent: Feb. 3, 1998

[54] CASSETTE DRIVE APPARATUS AND METHOD USING A TAPE ENGAGER INSERTABLE INTO A LATERAL ACCESS OPENING OF AN AUDIO CASSETTE

[76] Inventor: Kah On Koo, 1448 West 55th Avenue, Vancouver, British Columbia, Canada, V6P 1R5

[21] Appl. No.: 590,161

[22] Filed: Jan. 23, 1996

Related U.S. Application Data

[63] Continuation of Ser. No. 262,490, Jun. 20, 1994, abandoned.

[51] Int. Cl.⁶ .................................................. G11B 15/60
[52] U.S. Cl. .................................................. 360/130.21
[58] Field of Search ........................... 360/95, 84–85, 360/130.21, 131

[56] References Cited

U.S. PATENT DOCUMENTS

| | | | |
|---|---|---|---|
| 3,612,539 | 10/1971 | Bragas | 274/4 C |
| 3,902,680 | 9/1975 | Neff | 242/198 |
| 5,214,547 | 5/1993 | Kondo | 360/94 |
| 5,278,707 | 1/1994 | Tsuchiya et al. | 360/85 |
| 5,321,565 | 6/1994 | Shibaike et al. | 360/85 |
| 5,430,586 | 7/1995 | Koo | 360/95 |

*Primary Examiner*—John H. Wolff
*Attorney, Agent, or Firm*—Bull, Housser & Tupper

[57] ABSTRACT

The invention permits outwards engagement of a magnetic tape from a conventional audio cassette for processing the tape in a manner to reduce prior art tape-to-head alignment problems. When the cassette is inserted into the apparatus, concurrently a tape engager is inserted into a lateral access opening associated with a cassette well (i.e. a capstan opening or cavity) and is positioned adjacent an inside face of the tape. The tape engager contacts a length of tape, and a head block assembly member is inserted into the well to cooperate with the tape and the tape engager to ensure separation between an outside face of the tape and the cassette, and to reduce contact between an inside face of the tape and a portion of the cassette. In one embodiment, the tape engager is rotatable to displace the tape outwardly with respect to the well. In another embodiment, the tape engager cooperates with a magnetic head to pinch the tape lightly to generate tape tension and contact pressure to ensure proper tape-to-head contact. In another embodiment, the tape engager is fixed to reduce mechanical complexity, and engages the tape passively with only a slight reduction in tape alignment control.

39 Claims, 3 Drawing Sheets

CASSETTE DRIVE APPARATUS AND METHOD USING A TAPE ENGAGER INSERTABLE INTO A LATERAL ACCESS OPENING OF AN AUDIO CASSETTE

CROSS REFERENCES TO RELATED APPLICATIONS

This is a Continuation of my application Ser. No. 08/262,490 filed 20 Jun. 1994, now abandoned.

BACKGROUND OF THE INVENTION

The invention relates to an apparatus and method for processing a magnetic tape housed within a cassette, in particular for performing all normal functions such as record, playback, fast-forward, rewind, search and cue, etc., on a conventional audio cassette.

The popular "Compact Cassette", a wade-mark of Philips Export BV of The Netherlands, has been used for over 30 years for audio recordings. Although it is commercially very successful, it has some faults inherent in a cassette in which accuracy of tape transport is dependent, to a great extent, on manufacturing accuracy of certain components of the cassette itself because the cassette is designed for processing the tape while it remains within the cassette. There have been many attempts to overcome problems inherent in ensuring accuracy of tape transport where the tape is maintained within the tape cassette, but some still remain, particularly head-to-tape alignment problems. Many of the problems of the Compact Cassette have been solved in the video cassette where the cassette is especially designed to permit the tape to be easily extracted from the cassette. However, prior art attempts to extract the tape from the Compact Cassette to improve accuracy of transport have been largely unsuccessful, at least commercially. U.S. Pat. Nos. 3,612,539 (Bragas) and 3,902,680 (Neff) both disclose devices for extracting tape from a Compact Cassette, but these devices are relatively complex and would not be appropriate for the applications of the present invention.

The present inventor has invented several devices for extracting and driving tape of a Compact Cassette, and these are disclosed in a co-pending international patent publication WO94/03893 which was published 17 Feb. 1994, disclosing international application PCT/CA93/00312 which was filed 30 Jul. 1993. This application PCT/CA93/00312 claimed priority from the inventor's co-pending U.S. application Ser. Nos. 923,840 and 977,263 which were filed 3 Aug. 1992 and 16 Nov. 1992 respectively the latter application issuing to U.S. Pat. No. 5,430,586 on 4 Jul. 1995. The said international and United States patent applications outline in greater detail many of the problems of prior art apparatus, and discloses several solutions to some of these problems and the disclosures are incorporated herein by reference. Some of the present inventor's devices are relatively complex, and increase the size of the tape transport mechanism to be greater than conventional mechanisms, making them unsuitable for applications where a compact size is desirable, for example in personal or portable cassette players or automobile applications. The inventor recognised this limitation with some of his devices, and developed smaller devices, some of which are also shown in the publication. However, the cost to produce these smaller devices is relatively high and thus they would be relatively limited in their application, when competing with mass produced items of lower quality.

Because a very large portion of manufactured cassette hardware is targeted at low cost applications, such as inexpensive cassette units for personal portable and automobile applications, an improved cassette transport mechanism with very few additional parts and low manufacturing costs which could still attain the benefits of tape extraction was recognized by the inventor. This improved mechanism could displace the tape outwardly from the cassette shell for processing to a much smaller distance than shown in the said publication, which would reduce size of the unit while extending technical benefits of this processing method to these categories of cassette hardware, in addition to increasing reliability.

SUMMARY OF THE INVENTION

The invention reduces the difficulties and disadvantages of the conventional Compact Cassette and other Compact Cassette apparatus which displace a length of tape from the cassette for driving and processing of the tape. The invention provides an apparatus and method for engaging the tape in a well of the cassette and uses a greatly reduced number of parts which reduces manufacturing costs and increases reliability. The invention uses a tape engager to process the tape clear of the many portions of the cassette and tape-to-head alignment problems relating to inaccuracies of the cassette body are essentially eliminated.

In some embodiments, the tape is displaced a small distance from one of the outer wells of the cassette, namely the supply side or reverse side well, to avoid problems associated with the pressure pad in the centre well. In another embodiment tape tension is increased to improve tape-to-head contact by adjusting the position of the tape engager to be in proximity of a magnetic head gap contact area, so as to improve the tape travelling characteristics of the tape across the head surface. In another alternative, mechanical complexity is further reduced by using a fixed tape engager to displace the tape laterally of the cassette while the tape is inserted into a final position in the cassette compartment. This eliminates any need for moving parts in the tape engager which initially displaces the tape.

An apparatus according to the invention is for transporting and scanning a tape extending between the supply reel and the take-up reel of a tape cassette, the tape extending across an access well located in a processing edge of the cassette, the access well providing access to the tape. The reels are rotatable about reel drive axes to transport the tape therebetween. The apparatus includes locators, a tape engager and a head block assembly member and means for mounting and moving said member. The locators locate the cassette in a pre-determined position in the apparatus for processing the tape. The tape engager is for engaging a portion of the tape as it passes across the well and is elongated and parallel to the reel drive axes. The tape engager is adapted to pass initially into at least one of a pair of transversely aligned lateral access openings provided in side walls associated with the access well to extend at least partially across the well. The tape engager is stationary when the tape is being transported between the reels and is located to contact an inside face of the tape to reduce contact that would otherwise occur between the inside face of the tape and a portion of the cassette. The means for mounting and moving the head block assembly member moves the member into the access well to contact an outside face of a portion of the tape generally adjacent the tape engager. The head block assembly member is positionable to cooperate with the tape to prevent contact between the outside face of the tape and the cassette. The member of the head block assembly that contacts the tape to prevent the said contact of the outside face of the tape with the cassette can be a magnetic head or a tape guide, or both. Preferably, the tape engager is shaped to engage an undisturbed length of tape extending in an initial position thereof across the well as the cassette is inserted into the apparatus. The tape engager can be either fixed with respect to the locators or movable with respect to the locators. If it is movable, the tape engager can be moved between a fully retracted position alignable with the access opening to permit insertion of the cassette into the apparatus, to a fully extended position in which the tape engager displaces a portion of the tape to a displaced position to be contacted by the magnetic head.

A method according to the invention is for transporting and scanning a tape extending between a supply reel and a take-up reel of a tape cassette. The tape cassette has a cassette body, at least one access well located in a processing edge of the cassette body to provide access to the tape, and a pair of transversely aligned lateral access openings in side walls of the cassette body associated with said well. The method comprises the steps of: causing a tape engager to pass into at least one of the openings of the pair of transversely aligned access openings to extend at least partially across the well so that the tape engager approaches an inside face of a portion of tape extending across the well as the cassette is located in a predetermined position in the apparatus for transporting and scanning the tape; maintaining the tape engager stationary when the tape is being transported between the reels and contacting the inside face of the tape to reduce contact that would otherwise occur between the inside face of the tape and a portion of the cassette; and moving a head block assembly member into the access well to contact an outside face of the tape to prevent contact between the outside face of the tape and the cassette.

The method is further characterised by shifting the tape with the tape engager from an initial undisturbed position of the tape extending across the well as the cassette is moved into the pre-determined position.

A detailed disclosure following, related to drawings, describes preferred apparatus and method according to the invention which are capable of expression in apparatus and method other than those particularly described and illustrated.

DETAILED DESCRIPTION

First embodiment—FIGS. 1 through 4

Figure 1:
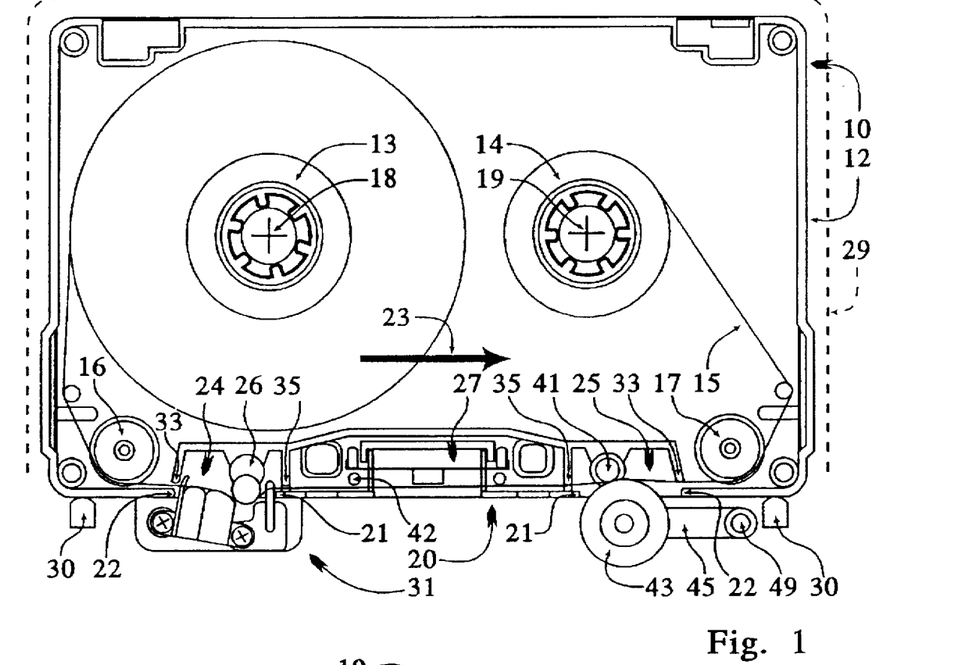
FIG. 1 is a simplified diagram of a first embodiment of the invention and a conventional Compact Cassette showing components associated with engaging, guiding, feeding and scanning a displaced portion of tape extending from the cassette, the apparatus being shown in a PLAY/RECORD mode.
Figure 2:
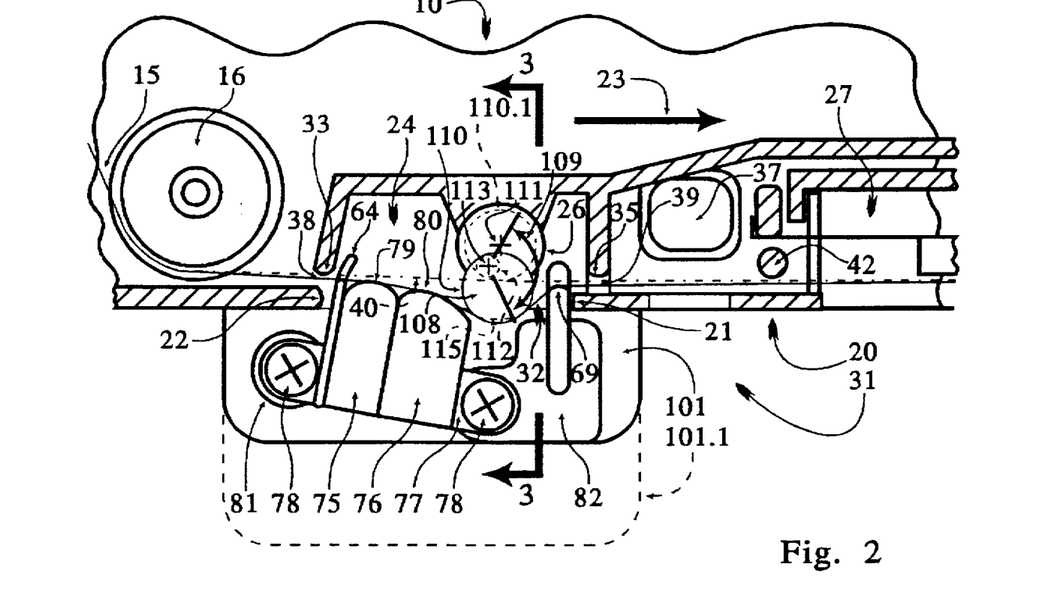
FIG. 2 is a fragmented diagram of an enlarged portion of FIG. 1, showing a cassette well partially in section with magnetic heads and guides inserted thereinto, a tape engager in extended and retracted positions, and path of the tape prior to displacement and after displacement.

FIG. 1 and 2

Referring mainly to FIG. 1, a conventional Philips Compact Cassette 10 as used in conventional audio cassette machines has a cassette body or shell 12 enclosing a supply reel 13 and take-up reel 14 carrying a magnetic data bearing tape 15. The cassette reels are journalled for rotation about respective reel drive axes 18 and 19, which axes are permitted to float laterally to accommodate manufacturing tolerances in the tape drive apparatus as is well known. The cassette body also has a supply guide roller 16 and a take-up guide roller 17 located adjacent the reels 13 and 14 and front corners of the body and adapted to align the tape 15 so as to extend between the rollers and generally parallel to a processing or front edge portion 20 of the cassette body. For convenience, the tape is assumed to be fed in direction of tape feed arrow 23 between the supply and take-up reels 13 and 14 in the normal play/record mode.

The processing edge portion 20 of the cassette body also has a first outer or supply well 24, which is located closest to the supply reel 13, and a second outer or take-up well 25, which is located closest to the take-up reel 14. The wells 24 and 25 are similar but mirror images of each other and are located on opposite sides of a centre well 27. In contrast with the prior art, as disclosed in the preferred embodiment herein, the centre well 27 does not receive a magnetic head and is not required for normal functioning of the invention. The wells 24 and 25 are termed herein as a "access wells" and are defined in part by laterally spaced portions of parallel, generally flat, broad faces of side walls of the cassette. The side walls of the cassette adjacent the well 24 have a pair of transversely aligned openings, termed capstan openings or lateral access openings 26, which receive a capstan when the well 24 is positioned to be a take-up well in conventional cassette systems. A transverse axis 111 of the opening 26 is parallel to the reel drive axes 18 and 19. A similar undesignated pair of aligned access openings are provided for the well 25. The wells are further defined by short transversely extending inner and corner webs 21 and 22 which extend between the generally flat faces of the cassette, and form portions of the processing edge portion 20 of the cassette.

The wells 24 and 25 are further defined by corner and inner bridges 33 and 35 which extend transversely between the broad faces of the cassette body and have outwardly facing edges spaced from inwardly facing portions of the respective adjacent webs by small gaps. The gaps accept an intermediate portion of an essentially undisturbed length of the tape 15 extending generally linearly across the well in an initial undisturbed position 40 (shown in broken outline in FIG. 2) between the rollers 16 and 17. The gaps between the corner bridges 33 and the respective corner webs 22 are termed control gaps 38, and the gaps between the inner bridges 35 and the respective inner webs 21 are termed clearance gaps 39, and are seen in FIG. 2. The remaining webs of the processing edge portion 20 have similar transverse bridges associated therewith and spaced therefrom, but these are undesignated. In the control gaps 38, the corner bridges 33 can be in light contact with the intermediate portion of the tape extending between the rollers 16 and 17, as best seen for one bridge in FIG. 2, and provide an accurate location or datum plane for the tape as it is processed. A guide pin 42 is accurately located to extend between the sidewalls of the cassette and to be close to the tape to locate the tape when engaged by conventional magnetic head entering the centre well 27. The remaining undesignated webs and bridges are located to be clear of the tape by relatively close tolerances.

In the following descriptions, the terms "above" and "below" refer to relative positions of components as seen on the sheets of the drawings, and are not necessarily representative of true dispositions of the components in the actual apparatus. While the present apparatus could be used in a "top-loading" tape deck apparatus, where the cassette lies generally horizontally, modem preferences are for a "front-loading" apparatus, wherein the cassette is disposed vertically. Particularly in front-loading apparatus, it is preferable to reduce space required for the tape transport apparatus within the plane of the cassette, so as to occupy less "vertical space". Many of the components are conventional, e.g. reel motors, brakes, sensors, bearings, etc. and are secured or journalled on a transport chassis, and are not shown for clarity. Also, the apparatus is controllable through an essentially conventional control panel having conventional control functions as required. As many of the components are well known, they are neither illustrated or described.

A record/playback tape transport apparatus 28 has a cassette compartment 29 provided with cassette body holding means, in this instance two laterally spaced apart datum surfaces 30 which engage the processing edge portion 20 of the body 12. The cassette body is resiliently urged against the surfaces and is generally similar to those used in conventional cassette transports. The datum surfaces 30 serve as locators to locate the cassette body in a pre-determined position in the apparatus for transporting and scanning the tape and alternative locators can be substituted as is well known. The first embodiment 31 of the apparatus includes a capstan 41 and associated pinch roller 43 journalled on a pinch roller mounting arm 45, which is mounted for rotation about an arm hinge 49. As is conventional practice, the capstan 41 passes through the transversely aligned lateral access openings or capstan openings associated with the take-up well 25, the well accepting the pinch roller 43 to drive the tape as shown.

Referring to FIG. 2, the first embodiment 31 further includes a first tape guide 64 located adjacent one edge of the supply or first outer well 24, and a second tape guide 69 located adjacent an opposite side of the supply well. The first tape guide 64 can be similar to a conventional fork guide and is mounted on a first magnetic head 75 which is mounted adjacent to a second magnetic head 76. Both heads 75 and 76 are mounted on a head subplate 77, and with the guides 64 and 69 comprise the entire head block assembly which is mounted on mount supports 81 and 82 by mounting and adjustment screws 78. The second tape guide 69 functions not only as a fork guide to contact edges of the tape to control tape alignment, but also has a critically located tape contact portion to displace the tape laterally. The guide 69 extends from the mount support 82 and is integral with the support. The mount supports are attached to a head plate 101, shown in solid outline in an extended or engaged position, and shown in broken outline 101.1 in a retracted or disengaged position. The second guide 69, the hems 75 and 76, the first guide 64 and associated head plate 101, etc., can be generally similar to a prior art cassette head block assembly, which is mounted for movement between an extended position as shown in full outline 101, and a retracted position as shown in broken outline at 101.1. The head plate 101 is moved and guided by conventional head plate moving and guiding structure found in conventional cassette apparatus, and is not illustrated herein. In the extended position of the head plate, the heads 75 and 76 contact a length of tape extending between the first and second tape guides.

In addition to the second tape guide 69, the invention also includes a tape engager 110 which is movable between an extended position shown in full outline, and a retracted inoperative position shown in broken outline at 110.1. The tape engager has an engager body 108 having a generally circular cross section as shown in FIG. 2, and is rotatable about an eccentric or engager axis 113 through an obtuse angle 109 between the extended and retracted positions as will be described, the angle 109 being between about 120 and 130 degrees. The engager body 108 has a diameter slightly smaller than diameter of the capstan opening 26, and thus, when in the retracted position as shown in broken outline, is aligned with and can pass through the capstan opening into the well 24 as will be described.

In accordance with the tape feed direction 23 during recording and playback modes, the tape contacts components in the cassette body 12 and the first embodiment of the apparatus 31, in the following order: the guide roller 16, the first tape guide 64, the first magnetic head 75 at a first tape contact surface 79, the second magnetic head 76 at a second tape contact surface 80, the tape engager 110 in the extended position, and finally the second tape guide 69, before exiting the supply well 24 and passing into other wells of the cassette 10.

Figure 3:
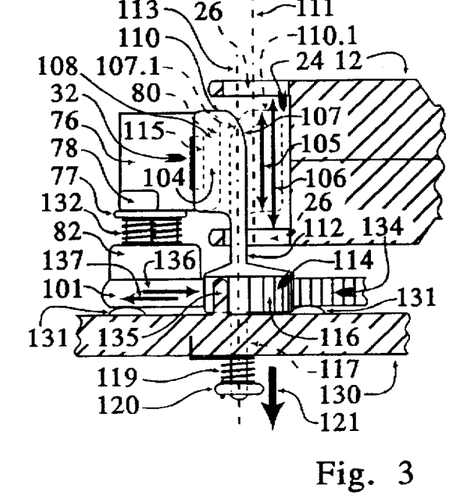
FIG. 3 is a fragmented section on line 3—3 of FIG. 2, showing the tape engager and associated components in relation to the cassette shell and head block assembly components.

The body 108 of the tape engager 110 is mounted on top of a support shaft or support portion 112, which has a circular cross-section as shown in broken outline in FIG. 2, the body being used to displace the tape from the undisturbed or initial position 40, shown in broken outline. During the initial insertion of the cassette 10 into the apparatus, the head plate 101 and magnetic head and guide components mounted thereon is in the retracted position 101.1 (broken outline), and the tape engager 110 is also in the retracted position 110.1 (broken outline). When the tape engager 110 is in the retracted position 110.1, a central axis of the body 108 is aligned and generally coincident with the transverse axis 111 of the capstan openings 26 which extends perpendicularly with respect to the cassette body, as best seen in FIG. 3. This permits the tape engager 110 to pass without interference into the capstan opening 26 located adjacent the supply well 24. Consequently, the tape engager 110 is located inside the well 24 and closely adjacent an inside face of the undisturbed tape position 40 after cassette insertion into the apparatus. It is noted that the eccentric or engager axis 113, and outline of the engager support shaft 112 are located within the periphery of the capstan opening 26.

Referring to FIGS. 1 and 2, when the apparatus enters a play or record mode, the pinch roller 43 is held against the capstan 41 by conventional means to pinch and pull the tape in the feeding direction 23 for driving the tape. Concurrently, the head plate 101 moves into the engaged position, bringing the tape guides and head components mounted thereon in proximity with the well 24 and the undisturbed tape position 40. At the same time, the tape engager 110 rotates clockwise and eccentrically about the engager axis 113 through the obtuse angle 109 to attain the extended position and concurrently displaces the length of tape from the initial position 40 outwardly of the well 24 to a final displaced or shifted position 32, shown in full line. The shifted or displaced portion of the tape in the position 32 contacts and extends between the guides 64 and 69, and contacts the tape contact surfaces 79 and 80 of the heads for processing of the tape in the normal manner.

During tape travel in the Record or Play modes, the tape 15 is separated from or is in negligible contact with corner bridge 33, the inner bridge 35 and the guide pin 42. Thus, influences on tape alignment due to positioning or manufacturing inaccuracies of the cassette body or shell are avoided. At the same time, the first guide 64 and second guide 69 prevents undesirable contact of the displaced portion of tape with the corner web 22 and inner web 21 respectively.

Figure 4:
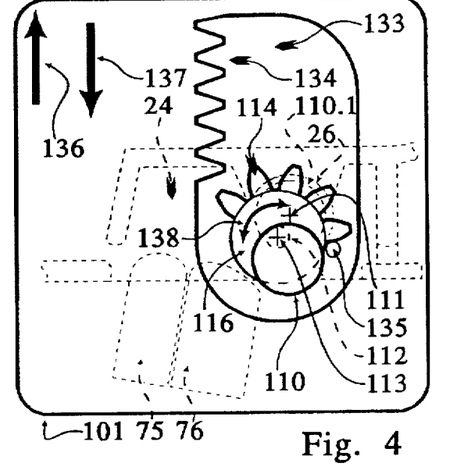
FIG. 4 is a fragmented, simplified diagram of an enlarged portion of FIG. 1, showing components associated with the operation of the tape engager in a fully extended position.

FIGS. 3 and 4

Referring to FIG. 3, the apparatus is shown in the play or record mode with the tape engager shown in the extended position in solid outline at 110. The support shaft has a support shaft axis which coincides with the eccentric axis 113 and is generally parallel to the axis 111 of the openings 26 and the central axis, not shown, of the cylindrical body 108. Because the axis 111 is parallel to the reel axes 18 and 19, the eccentric axis 113 is also parallel to the axes 18 and 19 (FIG. 1). The body 108 has a smoothly contoured lead-in portion 107 at an outer end thereof which provides a contact face which is inclined obliquely to the reel axes 18 and 19 and transverse axis 111 and extends smoothly from an upper surface of the body 108 to an outer surface of the support shaft 112.

When the cassette is to be inserted into the apparatus, the tape engager is located in the retracted position as shown in broken outline at 110.1. Thus the lead-in portion 107 is located in a generally opposite position as shown at 107.1 and faces outwardly of the cassette. The lead-in portion at 107.1 is located inwardly of an inside face of the undisturbed length of tape as the cassette is inserted into the apparatus, i.e. located on a side of the tape adjacent the cassette. Thus, as the tape engager 110 enters the lower opening 26 during initial insertion of the cassette into the apparatus, the inclined lead-in portion, as shown at 107.1 faces outwardly and assists in guiding the tape 15 when the tape is first engaged by the tape engager. A main peripheral portion 104 of the tape engager body 108 has a contact face aligned with the portion 107 and disposed generally parallel to the reel axes 18 and 19 and located outwardly of an outside face of the length of tape when the cassette is in the pre-determined position. Thus, it can be seen that the tape engager is shaped to displace the shifted portion of the tape outwardly of the well as the cassette is approaching the pre-determined position in the apparatus. The contact face of the main portion 104 extends around a swept portion of the periphery of the engager body because as the engager is rotated through the angle 109 (FIG. 2) between retracted and extended portions, the swept portion of the periphery is "swept" by the tape. When the engager is in the extended position an outwardly facing portion of the main portion 104 contacts the tape in the position 32 as shown and is accurately parallel to the axes 18 and 19 to avoid "skewing" of the tape.

The body 108 of the tape engager has a length 105 which is less than inner spacing 106 between opposing faces of side walls of the well to avoid interference with the side walls of the well as the engager is rotated in the extended position thereof. As previously stated, the body 108 has a transverse cross-sectional area smaller than the transversely aligned access openings 26 of the cassette body so as to pass therethrough. In addition, the support shaft 112 of the tape engager is smaller in transverse cross section than the transverse cross section of the body and is mounted aligned with an outer side of the body when in the retracted position to provide the eccentric mounting of the body on the support shaft. The eccentric mounting provides a maximum "throw" of the engager as it rotates from the retracted position to the extended position which provides relatively large displacement of the tape outwardly from the cassette body to permit access to the tape by the magnetic hems. In this way, the tape engager is movable between a fully retracted position alignable with the access openings to permit insertion of the cassette into the apparatus, and a fully extended position in which the tape engager displaces the shifted portion of the tape to a displaced position to be contacted by the magnetic hems. Clearly, the tape engager is mounted for rotation about the engager axis 113 which is disposed perpendicularly to side walls of the cassette body and parallel to the reel drive axes 18 and 19.

The support shaft 112 has a lower portion connected to a pinion gear sector 116 having gear teeth 114. The gear sector 116 cooperates with a straight toothed gear rack 134 provided along an edge of a cavity 133 in the hem plate 101 for controlling the movement of the tape engager 110, as will be explained in FIG. 4. The apparatus includes a transport chassis 130 which supports most of the components of the invention. An upper surface of the chassis has thrust bearings 131 which engage the head plate 101 and facilitate lateral movement of the head plate in direction of arrows 136 and 137, i.e. for extension and retraction of the head plate. The shaft 112 of the tape engager has a spindle 117 which is journalled in a complementary opening passing through the chassis 130. A torsion and compression spring 119 encloses a lower end of the spindle 117 on the opposite side of the chassis 130. The spring 119 is retained on the spindle 117 by a retaining ring 120 mounted rigidly with spindle 117 and contains an anchoring means, not shown, for a first end portion of the spring 119 to pass through and rotate therewith. A second end portion of the spring 119 is anchored to the chassis 130 to apply a spring rotational bias to the spindle 117. The spring is compressed by the retaining ring 120 and thus also applies a downward bias force in the direction of an arrow 121 to force the spindle 117 and attached gear sector 116 and tape engager 110 towards the chassis 130 to essentially eliminate vertical play along the spindle, while concurrently permitting rotation with respect to the chassis. A stop pin 135 extends from the chassis 130 to serve as a rotational stop for the gear sector 116 against the spring bias, as will be explained in FIG. 4.

The second magnetic head 76 can be seen supported on the head subplate 77 which in turn is secured by the screw 78 passing through a head spring 132 into the mount support 82. The head spring 132 encloses the screw and permits alignment adjustments of the head with respect to the head plate following conventional practise.

Referring to FIG. 4, portions of the cassette well 24 and first and second magnetic hems 75 and 76 are shown in broken outline in relation to the head plate 101 in the extended position. The cavity 133 in the head plate 101 accommodates movement of the head plate in the extension and retraction directions of the arrows 136 and 137 respectively without interference with the pinion gear sector 116. The cavity 133 has a straight edge with the toothed gear rack 134, which is shown disengaged from the gear teeth 114 of the sector 116 when the apparatus is in the extended position. In this position, the gear sector 116 and attached tape engager 110 are held in the extended position by the spring bias force from the torsion spring 119 as shown in FIG. 3. The spring 119 applies a clockwise bias force to the spindle 117 which forces one portion of the sector 116 against the stop pin 135, thus maintaining a secure final position of the tape engager when in the extended mode.

During the retraction of the head plate, such as required in eject, stop or fast wind modes of the apparatus, the head plate 101 is retracted by the conventional means to move in the direction of the arrow 137. The gear rack 134 on the inside face of the cavity 133 thus moves towards the pinion gear sector 116 to eventually engage the gear teeth 114 thereof, which rotates the sector and the attached tape engager 110 about the eccentric axis 113 through the obtuse angle 109 (FIG. 2) against the spring bias force. When the head plate 101 reaches the retracted position, the tape engager 110 assumes the retracted position as shown in broken outline at 110.1 in FIG. 2. Thus, components mounted on the head plate 101 and tape engager 111 will be clear of the cassette body and permit other modes of operation of the apparatus, and also permit removal of the cassette from the apparatus.

OPERATION

The cassette 10 is inserted in the cassette compartment 29 in the normal manner, and is positioned to be resiliently held against the datum surfaces 30. During insertion of the cassette, the tape engager 110 is in the retracted position 110.1 and thus is aligned with and passes through the capstan opening 26, to assume the position shown in broken outline in FIG. 3. During insertion, an inside face of the tape engages the lead-in portion 107 of the tape engager, which displaces the tape slightly outwardly of the cassette so that the tape engager maintains engagement with the inside face of the tape. Following normal practice, the head plate 101 is in the retracted position 101.1 during tape insertion and removal, and thus the various components of the head plate are well clear of the cassette.

To enter the record/play mode, following conventional practice, the head plate 101 moves inwardly in direction of the arrow 136. This causes the first and second tape guides 64 and 69 to engage edges of the tape, while the magnetic heads 75 and 76 approach the cassette well. Referring to FIG. 4, in the retracted position of the head plate, the gear rack 134 is engaged with the gear sector 116, and as the head plate moves inwardly, the gear sector 116 and the spindle 117 rotate clockwise about the axis 113. Simultaneously, the tape engager rotates clockwise from the retracted position 110.1 to attain the extended position in full outline as shown in FIG. 2. Thus the contact surface of the tape engager is shifted by rotating the contact surface about the engager axis 113 which is disposed generally perpendicularly to the side walls of the cassette and also passes through one of the aligned openings 26 of the cassette. When the head plate approaches the engaged position, the sector 116 is gradually released against opposing spring bias forces and finally disengages from the rack 134 and is held against the pin 135 in an accurate location. The tape contacts the surfaces 79 and 80 of the heads and passes from the heads, around the contact surface of the tape engager and the second tape guide 69 prior to leaving the well.

Thus, in summary, the first and second tape guides 64 and 69 are locatable into the well 24 to locate the shifted portion of the tape to prevent undesirable contact of the outside face of the tape with the cassette body as the tape passes across the well. In addition, the magnetic head is mounted for movement to be located in the well to contact the shifted portion of tape displaced by the tape engager at a position between the first and second tape guides. The tape is now ready for recording or playback in a conventional manner.

It can be seen that the tape is shifted from the undisturbed position in two stages, namely an initial stage and a final stage. The initial stage occurs as the cassette is inserted into the apparatus and results in a relatively small displacement when the tape engager is initially located to pass adjacent an inside face of the tape extending in the initial position thereof. The final stage occurs after the cassette has been inserted and results from movement, i.e. rotation, of the tape engager with respect to the cassette.

For fast winding, the head plate is retracted to the retracted position 101.1 causing the tape to disengage the tape guides 64 and 69, the heads 75 and 76, and the tape engager which also retracts to the retracted position as shown in broken outline in FIG. 2.

It can be seen that the method of the invention can be summarized as follows. The tape engager 110 passes into at least a first one of the openings of the pair of transversely aligned access openings 26 associated with the supply well, so that the tape engager approaches the undisturbed length of tape extending in the initial position thereof generally linearly across the well. The tape engager moves a shifted portion of the tape generally outwardly from the initial position of the tape which in this embodiment is performed in two stages as described. The method further comprises locating the shifted portion of the tape with the first and second tape guides 64 and 69 respectively so as to prevent undesirable contact of the outside face of the tape with the cassette body as the tape passes across the well. Also, a magnetic head is located in the well to contact the shifted portion of the tape between the first and second tape guides.

ALTERNATIVES

The tape is shown to be shifted in the initial and final stages but the initial stage can be omitted, if desired, by dimensioning and/or positioning the engager to be clear of the inside face of the tape during initial insertion and when the cassette is in the predetermined position.

In the first embodiment described above, and in later embodiments to be described, the magnetic heads and tape guides are shown engaging a portion of the tape as it passes essentially linearly across the supply well. In this arrangement, the capstan and pinch roller cooperate with the tape in the take-up well following conventional practice. The processing edge portion 20 of the cassette has two smaller wells located closely adjacent opposite sides of the centre well, which smaller wells were originally designed to receive a tape end sensor. These smaller openings are also each provided with a respective pair of transversely aligned reference pin openings 37, see FIG. 2, for receiving reference or locater pins, not shown, as a substitute for the datum surfaces 30 to locate the cassette body. If suitably small record/playback heads are available, these smaller wells can be used instead of the supply well as shown, in which case the tape engager would pass through the reference pin openings 37 associated with the smaller wells. While use of these smaller wells and reference pin openings is not shown, their use is clearly within the spirit of the present invention.

Figure 5:
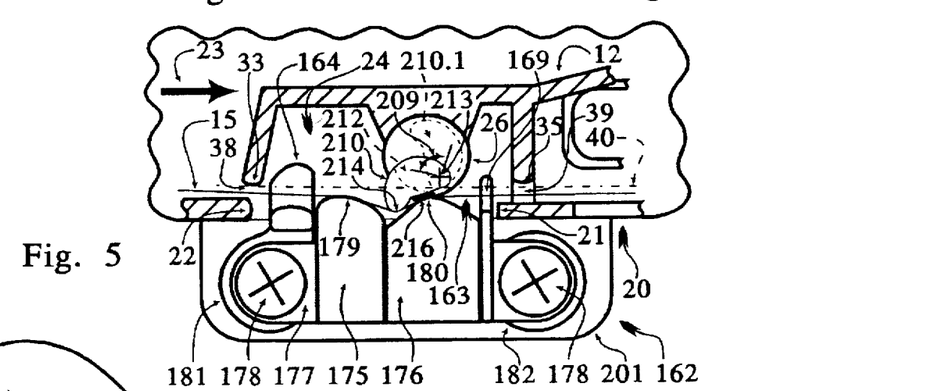
FIG. 5 is a fragmented, simplified diagram of an enlarged portion of the cassette of FIG. 1 and portions of a second embodiment of the invention, showing alternative components associated with engaging, guiding, feeding and scanning a displaced portion of tape extending from a conventional Compact Cassette, the apparatus being shown in a STOP/PAUSE/PLAY/RECORD mode.

Second embodiment—FIG. 5

The first embodiment of FIGS. 1 through 4 discloses a tape engager having a generally cylindrical body 108 mounted to rotate eccentrically about the axis 113 for displacement of the tape portion extending across a cassette well. A second embodiment 162 of the apparatus uses an alternative tape engager to reduce the space required by the tape engager within the cassette well. This permits utilization of the full width of the cassette well space for increased number of heads and/or increased width of the heads and/or guide components, while further improving tape travelling characteristics of the displaced tape portion.

In the second embodiment 162 of the apparatus, a displaced portion of tape is shown in a full outline position 163 extending across the supply well 24. The second embodiment 162 includes a first tape guide 164 located adjacent one edge of the supply or first outer well, and a second tape guide 169 located adjacent an opposite side of the supply well and both function similarly to fork guides. The first tape guide 164 is broader than the equivalent first guide 64 of FIG. 2 to improve guidance and extends from a first mount support 181 and is integral with the support. A first magnetic head 175 is mounted adjacent to a second magnetic head 176, and both heads 175 and 176 are mounted on a head subplate 177. The entire head block assembly as described is mounted on mount supports 181 and 182 by mounting and adjustment screws 178. The mount supports are attached to a head plate 201, shown in full outline in an extended position. The second tape guide 169 is mounted on the second magnetic head 176.

The second embodiment 162 has an alternative tape engager 210 which has a body of generally kidney-like shape which is mounted for rotation about an eccentric or tape engager axis 213 between the extended position 210 as shown in full outline, and a retracted position as shown in broken outline at 210.1. The tape engager rotates through an angle 209 between the extended and retracted positions, the angle 209 being less than 100 degrees which is considerably less that the obtuse angle 109 of FIG. 2. This smaller angle requires less movement of a tape engager actuating mechanism, which can be similar to the pinion gear sector 116 and gear rack 134 of FIG. 4. Alternatively, as the rotation of the tape engager 210 is less than the engager 110 of the first embodiment, alternative actuating mechanisms can be substituted, for example a simple cam actuated follower can rotate the engager support in response to linear movement of the head plate. Similarly, an alternative link and slot arrangement can be used to generate the reduced rotation of the engager shaft. In addition, the body of the alternative tape engager 210 has a cross-sectional area considerably less than that of the tape engager 110, and thus occupies less space in the well, permitting use of larger heads, or a greater number of magnetic heads in the well.

In accordance with the tape feed direction arrow 23, during recording and playback modes, the tape contacts components of the second embodiment of the apparatus 162 in the supply well 24 in the following order: the first tape guide 164, the first magnetic head 175 at a first tape contact surface 179, the tape engager 210 in the extended position at an engager contact surface 214, the second magnetic head 176 at a second tape contact surface 180, and finally the entry tape guide 169, before exiting the supply well 24 into other wells of the cassette 10. It can be seen that the engager contact surface 214 projects a maximum distance from a generally concave face of the kidney-shaped body portion of the engager. The concave face is to provide clearance for a projecting portion of the magnetic head 180 to provide good contact of the tape with the engager, and for other purposes as will be described.

The second embodiment of FIG. 5 bears many similarities to the first embodiment of FIGS. 1 through 4. Thus, the kidney-shaped body of the tape engager 210 is mounted on top of a support shaft 212 (shown in broken outline), which is rotated similarly to the shaft 112 in FIGS. 2 and 3 to displace the tape from the undisturbed position 40, shown in broken outline. In contrast to the circular cross-section of the support shaft 112 of FIG. 2, the support shaft 212 has an oval-shaped cross-section to provide a greater modulus to enhance rigidity of support of the engager 210. Similarly to the first embodiment, during the initial insertion of the cassette 10 into the apparatus, the head plate 201 and head and guide components mounted thereon are positioned in the retracted position, not shown but similar to the broken outline 101.1 of FIG. 2, and the tape engager 210 is also in the retracted position 210.1 (broken outline). This permits the tape engager 210 to pass without interference into the capstan cavity 26 adjacent the supply well 24. Consequently, the tape engager 210 is located inside the well 24 opposite an inside face of the undisturbed tape position 40 after the cassette has been inserted into the apparatus.

When the apparatus enters a play or record mode, the head plate 201 moves into the engaged position as shown bringing tape guides and heads mounted thereon into proximity with the well 24 and undisturbed tape position 41. At the same time, the tape engager 210 rotates counterclockwise about the engager axis 213 through the angle 209 to attain the extended position as shown in full outline. The engager 210 displaces the tape from the initial position 40 outwardly of the well 24 into a final displaced position 163 in which the tape 15 also contacts the tape guides 164 and 169, and head contact surfaces 179 and 180 for processing of the tape.

Similarly to the first embodiment, during tape travel in the Record and Play modes, the tape 15 is separated from or is in negligible contact with corner bridge 33, the inner bridge 35 and the guide pin 42, not shown. Thus, influences on tape alignment due to positioning or manufacturing inaccuracies of the cassette shell are avoided. At the same time, the first tape guide 164 and second tape guide 169 prevent undesirable contact of the outside face of the displaced portion of the tape 163 with the corner web 22 and inner web 21 respectively.

Because of use of the full width across the well 24 for guide and head components, there is sufficient space for widening of the first guide 164 to provide improved guidance stability of the tape 15 entering the well 24. Furthermore, by adjustment of shape of the tape engager, the engager contact surface 214 can be selectively located where desired within a range of locations, thus accommodating various magnetic head sizes and shapes. Because the engager contact surface 214 can be located closely to the tape contact surface 180 of the record/playback head, tape-m-head contact pressure is increased due to "effective stiffening" of the tape near the desired head contact surfaces. As a result, tape tension in the vicinity of the engager contact surface 214 is increased without need for appreciable increase in supply reel hub back tension torque, thereby minimizing increase of capstan load torque while increasing tape-to-head contact pressure.

In addition, it is possible to modify this embodiment to permit rotation of the tape engager 210 further counterclockwise such that the engager contact surface 214 effectively lightly pinches the displaced tape in the position 163 directly against an area of the head surface near or at the tape contact surface 180 of the second magnetic head or record/playback head 176. The engager contact surface 214 is preferably concave so that some surface portions project from adjacent recessed surfaces of the surface 214 to permit the tape engager to "wrap" around the head. Preferably, a small pressure pad 216 is located in a hollow or concave portion of the surface 214 so that the pad can contact the inside face of the tape, to prevent the tape being pinched between two hard surfaces. Use of the pressure pad improves tape-to-head contact and can be in addition to the increased wrap of the head due to the concave shape of the contact surface. Thus, the tape is pinched between the engager 210 and the head 176 which essentially generates tape tension and contact pressure in a manner similarly to a conventional pressure pad assembly of a cassette tape, while avoiding well known disadvantages of a conventional pressure pad assembly. Thus, the contact surface 214 of the tape engager is generally concave to receive the magnetic head located partially therein to increase wrap of the tape around the magnetic head, and optionally to pinch the tape thus improving tape-to-head contact. Similarly to the first embodiment, the support shaft 212 and the axis 213 are located within the capstan opening 26.

Figure 6:
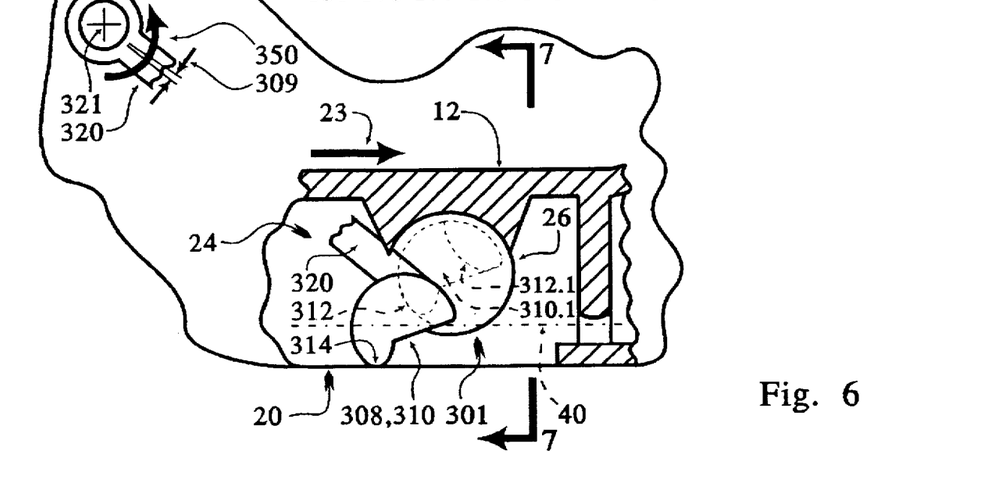
FIG. 6 is a fragmented, simplified diagram of an enlarged portion of the cassette of FIG. 1, and portions of a third embodiment of the invention showing an alternative tape engager in two positions and actuating structure therefor.
Figures 7, 8, 9:
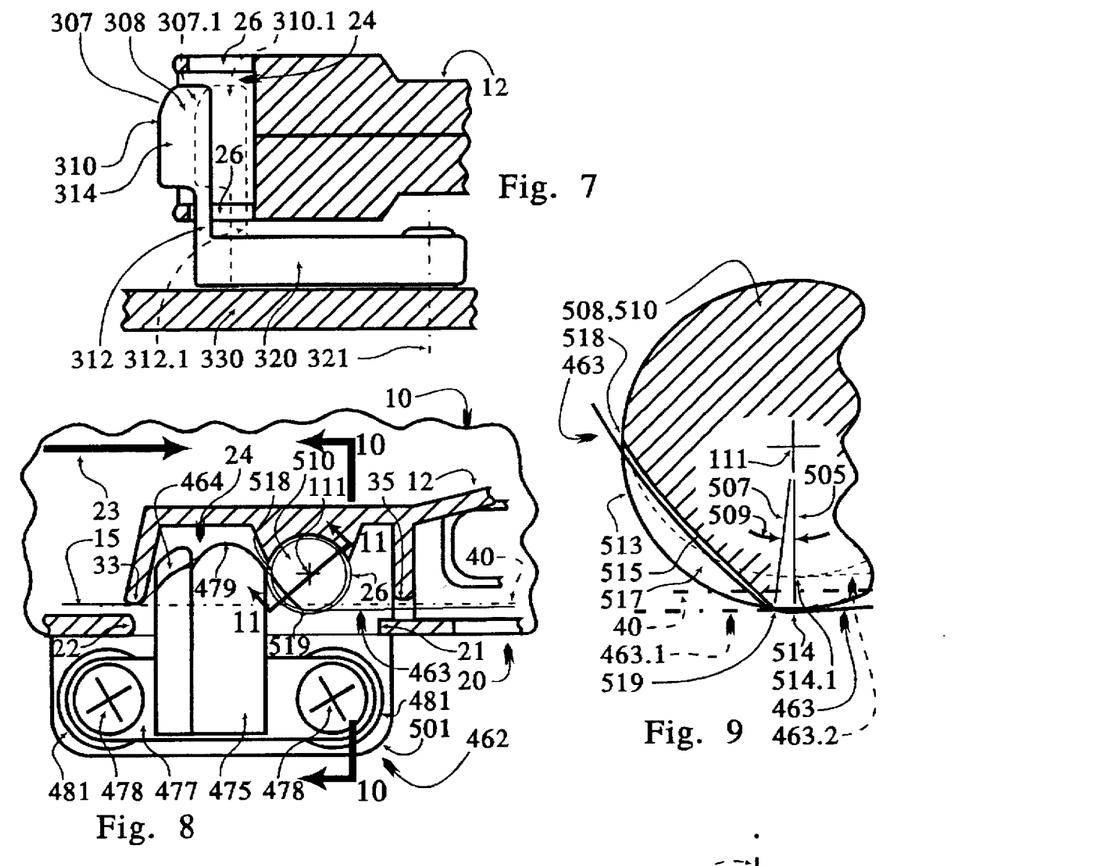
FIG. 7 is a fragmented, simplified section on line 7—7 of FIG. 6, showing the alternative tape engager and an associated support arm in relation to the cassette shell.
FIG. 8 is a fragmented, simplified diagram of an enlarged portion of the cassette of FIG. 1, and a fourth embodiment of the invention showing an alternative fixed tape engager and components associated with guiding, feeding and scanning a displaced portion of tape extending from a conventional Compact Cassette, the apparatus being shown in a STOP/PAUSE/PLAY/RECORD mode.
FIG. 9 is a fragmented, simplified cross-section diagram of an enlarged portion of the apparatus of FIG. 8 specifically showing the details of the alternative fixed tape engager, as shown on line 9—9 of FIG. 11.

Third embodiment—FIGS. 6 and 7

The first and second embodiments of FIGS. 1 through 5 disclose apparatus having a tape engager mounted to rotate about a support axis and support shaft which are located within the capstan opening of the cassette. A third embodiment 301 of the apparatus uses a tape engager 310 having a body 308 of similar shape to the body of the tape engager 210 of the second embodiment, but the tape engager is mounted for a different movement to realize more benefits.

In FIG. 6 the supply well 24 is shown with the tape engager 310 at an extended position in solid outline, the body 308 being mounted on top of a support portion 312, broken outline, of oval-shaped cross section extending downwards towards a tape engager arm 320, shown fragmented. The tape engager arm 320 has an outer end carrying the support portion 312, and an inner end journalled for rotation about a tape engager axis 321. The arm 320 is shown fragmented, and in practice the axis 321 is located some distance away from the capstan openings 26, so that the engager axis is disposed remotely from the opening 26, but is still parallel to the reel drive axes 18 and 19. In general, the arm 320 is made as long as possible, within the constraints of the apparatus, for reasons that will be apparent.

When the tape engager is retracted, the support portion 312 and the tape engager 310 are rotated through a relatively small angle 309 in the direction of arrow 350, to attain a respective retracted positions 312.1 and 310.1. (shown in broken outline). Length of the support arm 320 is relatively large when compared with the relatively small angle 309 through which the arm swings and therefore the path or locus traced out by the tape engager 310 is essentially a straight line. That is, spacing between the tape engager axis 321 and the transverse axis 111 of the openings 26 is at least several times greater than spacing between the fully extended and fully retracted positions of the tape engager, and thus rotation of the arm 320 causes the tape engager to move in an essentially straight line. This permits a greater degree of flexibility for design of the shape of the tape engager as a relatively large rotational displacement is not required as in the previously described embodiments. Similarly to the previously described embodiments, moving the tape engager from the extended to the retracted position aligns the tape engager with the capstan opening 26 which permits the tape engager 310 to pass without interference into the capstan opening 26. Consequently, the tape engager body 308 is located inside the well 24 opposite an inside face of the undisturbed tape position 40 after cassette insertion into the apparatus.

Thus by the relatively small, essentially linear movement of the support portion 312, the engager contact surface 314 can be placed in a wider range of locations when extended, when compared to the range of locations possible in the first and second embodiments. In addition, the angle 309 is considerably smaller than the angle 209 of FIG. 5, and thus less movement of tape engager actuating mechanism is required, simplifying tape engager rotation between retracted and extended positions. The tape engager arm 320 cooperates with the head plate by a tape engager actuating mechanism, not shown, to control the movement of the tape engager 310 in conjunction with the movement of the head plate. The tape engager actuating mechanism can be gear teeth actuated as in the first embodiment, or a cam and follower mechanism, or slotted link arrangement as briefly described for the second embodiment.

Referring to FIG. 7, the tape engager 310 is shown in full outline in the extended position, and in broken outline in the retracted position 310.1. When retracted, the tape engager 310 is aligned with the capstan opening 26, i.e. it is positioned within the clearance provided by the capstan opening 26, to permit insertion or removal of the cassette body 12 without interference. Because movement of the tape engager 310 is essentially linear, relative positions of a lead-in portion 307 in the extended position, full outline, and a retracted position 307.1, broken outline, are essentially unchanged as shown. This contrasts with the first and second tape engagers 110 and 210 which rotate about their own axes.

In yet another alternative arrangement, the support portion 312 can be mounted on linear guides or rails to move the engager along a linear axis which intersects the axis 111, thus eliminating extra space required for the engager arm 320. This alternative is not shown, but is clearly contemplated by the present inventor and could be easily effected using cams and cam followers which cooperate with linear movement of the head plate.

Fourth embodiment—FIGS. 8 through 11

The first, second and third embodiments of FIGS. 1 through 7 disclose apparatus having a movable tape engager which moves to actively displace a portion of tape extending across a cassette well after the cassette is fully inserted. A fourth embodiment 462 of the apparatus uses a fixed tape engager to displace the tape from the cassette body while the cassette is being inserted, and subsequently guides the tape. That is, the tape engager is fixed with respect to the locators and lateral displacement of the tape is derived from shape of the tape engager which engages an undisturbed portion of the tape as the cassette is inserted into the apparatus and displaces the tape outwardly of the well as the cassette is approaching the pre-determined position in the apparatus. Thus, the tape is displaced laterally by relative movement occurring between the cassette and tape engager during cassette insertion, without requiring actual movement of the tape engager itself, which further simplifies the apparatus at the expense of slightly reduced tape guidance accuracy compared to all other embodiments.

Referring to FIG. 8, the apparatus is shown with a fixed tape engager 510 extending upwards from the chassis, not shown. Prior to insertion of the cassette 10 into the apparatus, the tape lies in the initial undisturbed position 40, as shown in broken outline, passing generally linearly across an outer portion of the capstan cavity 26 and the supply well 24. Similarly to the previous embodiments, a magnetic head 475 with a tape contact surface 479 is mounted adjacent a first guide 464, which can resemble a fork guide, both the guide and magnetic head being mounted on a head subplate 477. The entire head block assembly as described is mounted on mount supports 481 by mounting and adjustment screws 478. The mount supports are attached to a head plate 501, shown in an extended position. For tape processing, the head block assembly moves linearly from a retracted position, not shown but similarly to the previous embodiments, and enters the supply well 24 to attain the extended position as shown in which the guide, the engager and the head engage the tape for playback or record operations. Thus, after cassette and head insertion, the engager 510 and head displace a displaced portion of the tape outwardly of the well to a displaced position 463 (full outline) where it is separated from contacting the inner bridge 35 of the cassette.

Figure 10:
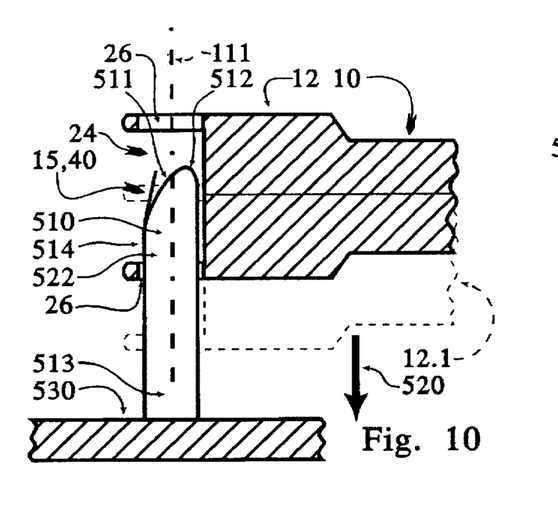
FIG. 10 is a fragmented, simplified section on line 10—10 of FIG. 8, showing the cassette inserted partially into the apparatus and the partially displaced tape cooperating with the fixed tape engager.

FIG. 10 shows an edge profile of a tape contact surface or portion 514 of the engager 510 which comprises an inclined lead-in portion 511 which is inclined outwardly to the axis 111 of the opening 26 from an extreme outer end portion 512 to merge smoothly with a lower or main portion 522. Thus, the tape engager has the longitudinally extending, outwardly facing, tape contact surface or portion 514 which comprises in part the outer end portion 512 having the inclined lead-in portion 511 to provide a contact face inclined obliquely to the reel axes 18 and 19, located inwardly of an inside face of the undisturbed length of the tape as the cassette is inserted into the apparatus. The tape contact surface or portion 514 further comprises the main portion 522 having a contact face disposed parallel to the transverse axis 111 and being located outwardly of an outside face of the tape when the cassette is in the pre-determined position. The contact faces of the inner and outer portions of the tape engager face outwardly from the cassette and merge smoothly together without a step.

Figure 11:
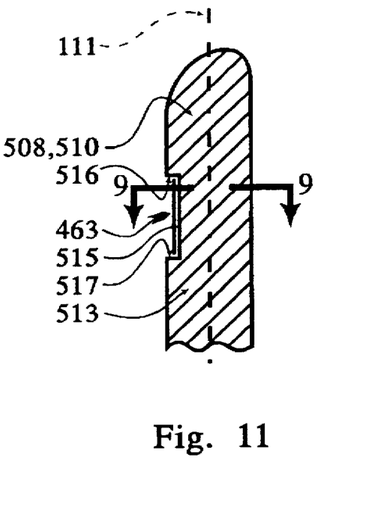
FIG. 11 is a fragmented simplified section on Line 11—11 of FIG. 8, showing a displaced portion of the tape engaging the tape engager.

Referring to FIGS. 9, 10 and 11, the tape engager 510 has an engager body 508 which has a generally circular cross-section with a generally flat guidance surface 515 extending as a shallow groove across a portion of the body. The surface 515 is a chord of the circular cross-section of the engager body which has a central axis which coincides with the axis 111 of the capstan openings 26. After the head 475 has entered the supply well to process the displaced tape portion 463, the tape is displaced by the head and is under light tension to engage the surface 515 which guides the displaced tape as it leaves the magnetic head 475. In FIG. 9, for clarity, the tape portion 463 is shown separated from the surface 515, although clearly during normal operation the tape is in intimate contact with the surface 515. Also, a left hand portion of the tape is shown in an intermediate position 463.1 after displacement of the tape by the engager but before contact by the head 475. Thus, the left hand portion of tape extends in the intermediate position from the right hand position 463 during insertion and removal of the cassette from the apparatus.

The tape engager 510 has upper and lower flat guide shoulder portions 516 and 517, shown in FIG. 11, which are parallel to each other and generally perpendicular to the surface 515 and contact both edges of the tape, similarly to a fork guide, to maintain proper guidance of the running tape. The surface 515 has an upstream edge 518 located closely adjacent the magnetic head to ensure accurate control of the tape immediately as it leaves the head, i.e. the surface 515 and the shoulder portions 516 and 517 control the location of the tape downstream from the head. Thus the tape engager 510 also serves as an integral second tape guide as well as a tape engager, and because it is fixed with respect to the locator 30 (FIG. 1) it provides accurate tape guidance. However, because the magnetic head 475 moves with respect to the tape engager, the guiding properties of the surface 515 and shoulder portions 516 and 517 of the engager 510 are not as accurate as the previously described second guides which are fixed relative to the magnetic head, and thus some tape guidance accuracy may be lost in this embodiment. The lower shoulder portion 517 or inner guide separates the body 508 from a support portion 513 which is connected to a transport chassis 530 and which has a similar circular cross-section as shown. The portion 513 can serve another purpose as will be described.

In FIG. 9, the tape contact surface 514 is a narrow strip passing axially along the engager 510 defining an outermost portion of the tape engager that is swept by the tape in the intermediate position 463.1 during insertion and removal of the cassette. After cassette insertion, a right hand portion of the tape is in the position 463 and extends from the surface 514 generally as a tangent to the circular cross-section. Thus, the tape position 463 is disposed essentially perpendicularly to a radius 505 extending from the surface 514 to the axis 111. The guidance surface 515 has a downstream edge 519 located closely adjacent to the tape contact surface 514, but spaced slightly therefrom for reasons to be described. A radius 507 extends from the edge 519 to the axis 111 and it is inclined at an angle 509 to the radius 505. The angle 509 is sufficiently large to ensure that the left-hand portion of the tape in the intermediate position 463.1 clears the shoulder portions 516 and 517 during insertion and removal of the cassette. The angle 509 is typically between about 5 and 10 degrees and provides an arcuate separation between the surface 514 and the edge 519. If the angle is much larger than 20 degrees the guidance surface 515 will be reduced in length excessively. Thus, the contact surface 514 is positioned adjacent but clear of the guidance surface to avoid interference between the tape in the intermediate position 463.1 and the shoulders. Thus, the tape guidance surface 515 is positioned clear of the contact surface or portion 514 so as to be cleared by the tape during insertion and removal of the cassette from the apparatus, and is engaged by the tape when the tape is displaced by the magnetic head during tape processing.

FIG. 10 shows a portion of the cassette body 12 in full outline partially inserted into the apparatus, and moving in a direction shown by an arrow 520 towards the transport chassis 530 to eventually attain a predetermined operative position 12.1, shown in broken outline. The tape engager 510 is shown partially entering the supply well 24 through a lower opening of the capstan openings 26, wherein the lead-in portion 511 of the tape engager shifts first the bottom edge of the undisturbed tape 44), and then the rest of the tape outwardly of the supply well 24. As the cassette moves per the arrow 520, the originally undisturbed tape portion 40, now disturbed, is displaced by the main portion 522 of the surface 514 which holds the tape clear of the shoulder portions 516 and 517, thus ensuring that the tape is not snagged by the shoulders of the guidance surface as it passes along the tape engager. Therefore, the tape is displaced in a direction outwardly of the supply well 24 while the cassette 10 is being inserted into the apparatus. Usually, the tape contact surface 514 maintains light contact with the tape during cassette insertion and removal.

In operation, during recording and playback mode as shown in FIG. 8, the tape feed direction is per the arrow 23 and the tape contacts components in the following order: the corner bridge 33, the first guide 464, the magnetic head 475 at tape contact surface 479, and the tape engager 510, before finally exiting the supply well 24 into other wells of the cassette 10. FIG. 11 shows the tape in full outline at 463 with both edges thereof engaging the guide shoulder portions 516 and 517 and an inner face thereof engaging the guidance surface 515. It can be seen that the tape engager 510 is the last component of the apparatus contacted by the tape before it leaves the supply well and thus it functions similarly to the second tape guides of the previous embodiments. Consequently, locations of the shoulder portions 516 and 517 are critical to assist in maintaining tape-to-head alignment. To remove the cassette, the magnetic head is withdrawn from the supply well which produces some slackness in the tape, and the cassette is withdrawn upwardly causing the tape contact surface 514 to be swept upwardly by the tape. The slight slackness in the tape extending across the well permits the cassette to be removed without fear of damage due to interference from the upper or outer guide shoulder portion 516 of the tape engager 510.

Because the tape contacts the corner bridge 33 during processing, tape guidance accuracy is partly influenced by the manufacturing accuracy of this bridge on the cassette. Also, in contrast with the previous embodiments, the head is movable with respect to the second tape guide, that is the engager, and consequently manufacturing tolerances in the apparatus could detract slightly from tape tracking accuracy. Therefore, guidance accuracy is slightly compromised in exchange for the simplicity and low manufacturing cost of this embodiment.

As best seen in FIG. 11, the guidance surface 515 is disposed parallel to the transverse axis 111 to avoid skewing of the tape. The surface 515 is disposed generally perpendicularly to the guide shoulder portions 516 and 517 which serve as upper and lower edge guides which are spaced apart along the tape engager and are generally parallel to each other and positioned to receive the tape passing therebetween. As viewed in FIG. 9, the guidance surface 515 is shown to be flat, but it could be slightly convex provided there is sufficient spacing between the surface 515 and the generally circular cross-sectional profile of the engager body to provide the edge guides or shoulder portions 516 and 517 with sufficient depth and length.

As indicated previously, the support portion 513 of the tape engager 510 can serve another purpose as follows. The tape engager can be shaped to engage an edge portion of the lower of the lateral access openings 26 to serve as a locator pin to locate the cassette body in the predetermined position for tape processing. Thus, although the opening 37 (FIG. 2) of the cassette normally can be used for reference pin locations, in this present alternative the capstan opening 26 can be substituted for location function of the opening 37. This substitution would permit elimination of at least one of the locators 30 which, in FIG. 1, are shown to engage outer portions of the processing edge 20 of the cassette body. When the tape engager is used in this manner, it can be seen that the tape engager serves three functions, namely to shift the tape outwardly of the access well for processing, to serve as a second guide means for guiding the tape as it leaves the access well, and also as a reference pin or locator to assist in locating the cassette in the predetermined position.

Following conventional practice, the cassette is resiliently urged by conventional means against two locators, one of which can be the tape engager in this instance, to hold the cassette in the predetermined position. As with use of other reference pins in the prior art, when the tape engager is used as a reference pin it locates the cassette against movement in mutually perpendicular directions, i.e. parallel to and perpendicularly to the processing edge 20 of the cassette body.

As in the previously described embodiments, in this alternative, the tape is displaced from the initial position thereof with the tape engager as the cassette is moved into the predetermined position for transporting and scanning the tape. Similarly to the previously described methods, the outer end portion of the tape engager is positioned adjacent an inside face of the undisturbed length of the tape and the tape is moved outwardly from the initial position thereof by causing relative movement between an obliquely inclined surface of the tape engager and the shifted portion of the tape.

In FIG. 8, the tape engager 510 is shown having a diameter and location such that the undisturbed length of tape 40 is displaced outwardly from the initial position in the cassette as the cassette is inserted into the predetermined position. This displacement provides adequate clearance between the inner bridge 35 and the tape in the displaced position 463: In an alternative, the tape engager 510 could have a smaller diameter and/or be located such that the undisturbed length of tape 40 in the initial position is unchanged, i.e. is not contacted by the tape engager when the cassette is in the predetermined position. In this alternative, a modified engager 510 has a contact surface 514.1 of FIG. 9 which is critically located so that when the head 475 is inserted into the well 24, the tape is displaced inwardly to a second disturbed position 463.2 (on FIG. 9) which is inward of undisturbed position 40, and in which there is still adequate clearance between the inner bridge 35 and the displaced length of tape 463.2. This requires accurate location of the alternative surface 514.1 as there is a tolerance of less than 0.5 millimetres between the tape in the displaced position 463, and when the tape would contact the inner bridge 35. In this alternative, it can be seen that the tape is not actively displaced outwardly of the well by the tape engager as with the unmodified engager, but instead the modified tape engager passively restricts excessive inwards movement of the tape as the tape is engaged by the head or a tape guide moving into the well. The tape engager thus restricts the tape against excessive movement into the well to prevent contact between the inner bridge 35 and the displaced position of the tape 463.2. Clearly, a change in position of the surface 514 does not effect the position of the tape upstream from the head 475, and thus the tape will still contact the corner bridge 33 as shown in FIG. 8. Thus, the tape engager contacts the inside face of the tape and serves to reduce contact between an inner face of the tape and the cassette that would otherwise occur when the head is inserted into the well 24. As in other embodiments, the head block assembly member, i.e. the head and/or tape guide is moved into the access well to contact an outside face of the tape to prevent contact between the outside face of the tape and the cassette.

The fourth embodiment tape engager 510 has a tape guide integrated with the tape engager which eliminates the need for a second tape guide. It is possible to incorporate alternative tape guides on the tape engagers of the three previously described embodiments, but because the tape engagers of the three previous embodiments displace the tape outwardly from the cassette a greater distance than the tape displacement in the fourth embodiment, the second tape guide cannot be eliminated since the outside face of the tape would then contact the cassette body. One example of a movable tape engager provided with a tape guidance surface is to be described with reference to FIGS. 2 and 3 which is thus a modified first embodiment. Clearly, similar modifications can be incorporated on the tape engagers of the second and third embodiments of FIGS. 5, and 6 and 7 respectively.

Referring to FIGS. 2 and 3, the tape contact surface of the engager body 108 has an optional guidance surface 115 which is shown only in broken outline and is generally similar to the guidance surface 515 of FIGS. 8 through 11. The surface 115 is a shallow groove which comprises a relatively flat surface and a pair of parallel guide shoulder portions which are located on opposite edges of the tape and disposed generally perpendicularly thereto and spaced apart to closely engage edges of the tape to provide accurate alignment of the tape. In this way, the tape leaving the heads 75 and 76 is under closer guidance control by the guidance surface 115 on the tape engager than when guided by the tape guide 69. This is because the surface 115 is located more closely to the head than the tape guide 69 as seen in FIG. 2. The tape guide 69 is still necessary to provide tape alignment in a plane parallel to width of the tape as will be described.

The guidance surface 115 occupies a section of the circumference of the engager body which is sufficient to guide the tape by providing a sufficient length of guide shoulder portions, which are engaged by the tape only when the tape is transported in a record, play or search mode. Clearly, to avoid interference of the tape with the guide shoulder portions when the cassette is inserted into, or removed from the apparatus, the tape guidance surface 115 is rotated to be on a side of the tape engager remote from the tape to avoid interference therewith during insertion and removal of the cassette from the apparatus.

The main similarities and differences of the four embodiments of the invention will now be briefly summarized.

In the first, second and third embodiments, the tape engager is moveable between a retracted position in which it is aligned with the access openings of the cassette and an extended position in which the tape is displaced outwardly from the well of the cassette.

In contrast, in the fourth embodiment the tape engager is fixed and the tape is only engaged by the engager during insertion of the cassette if the engager is of a sufficient size as in the unmodified engager. Otherwise, in the modified fourth embodiment the engager is engaged by the tape only upon entry of the magnetic head into the cassette well to engage the tape. In the modified fourth embodiment, the tape is displaced slightly inwardly into the cassette from the original undisturbed position of the tape, which contrasts with the outwards displacement of the tape in the remaining embodiments.

In the four embodiments illustrated, the cassette is located by the cassette body holding means or datum surfaces 30, but in the fourth embodiment, one of the datum surfaces 30 could be eliminated and a lower portion of the tape engager could engage a side of the access opening as a substitute locator. In all embodiments the first tape guide and/or magnetic head serves to guide the tape across the well before the tape leaves the well after contacting the second tape guide. The guiding function comprises two separate functions, namely a displacement function which is in a direction perpendicular to width of the tape, and an alignment function which is in a direction parallel to width of the tape. In the first embodiment the tape guide 64 primarily serves as a conventional fork guide by engaging edges of the tape to align the tape, and also has a portion which engages the face of the tape and thus serves to displace the tape. As seen in FIG. 2, the portion engaging the face of the tape is aligned with the magnetic head 75 and thus is somewhat redundant in this position. In contrast, the first guide 164 of the second embodiment of FIG. 5 serves purely as a fork guide to align the tape, and the face of the tape does not contact the guide 164, and thus the displacement function is performed only by the head 179. In the fourth embodiment of FIG. 8 the guide 464 contacts edges of the tape and the face of the tape to control both displacement and alignment of the tape, but the displacement is also in combination with the magnetic head 479.

With respect to the second tape guide, in the first embodiment of FIG. 2 the guide 69 provides both displacement and alignment of the tape, but these two functions can also be in combination with the guidance surface 115 of the tape engager 110 if this optional guidance system is provided. In the second embodiment of FIG. 5, the second guide 169 is a fork guide and controls only alignment of the tape, while the head 176 controls displacement of the tape. Clearly, the tape engager 210 of the second embodiment and the tape engager 310 of the third embodiment could be partially grooved to provide a guidance surface similar to that in the second embodiment which would also assist in aligning the tape immediately prior to passing over the head 176. In the fourth embodiment the tape engager 510 has the guidance surface 515 which controls both displacement and alignment of the tape downstream from the magnetic head.

From the above, it can be seen that the magnetic head and the first tape guide displace the tape inwardly into the well in the fourth embodiment only, which causes the tape to engage the guide surfaces, or in the remaining embodiments merely increases wrap of the tape around the tape engager and head. The first tape guide and head of each embodiment are mounted for concurrent movement on a respective head plate, and for convenience of terminology are referred to as the "head block assembly", the first tape guide and magnetic head being referred to individually as "head block assembly members". The head plate serves as means for mounting and moving the head block assembly member into the access well to contact an outside face of a portion of the tape generally adjacent the tape engager. It can be seen that the head block assembly member, that is either the tape guide, the magnetic head, or both, is positionable to cooperate with the tape to prevent contact of the outside face of the tape and the cassette. In contrast, the tape engager contacts an inside face of the tape to either eliminate or reduce contact between the inside face of the tape and a portion of the cassette.

From the above, it can be seen that the method of invention is characterized by passing the tape engager into a least one of the openings of the pair of transversely aligned openings to extend at least partially across the well of the cassette. To attain this position, the tape engager approaches an inside face of a portion of the tape extending across the well as the cassette is located in a pre-determined position in the apparatus for transporting and scanning the tape. The tape engager is maintained stationary when the tape is being transported between the reels, and contacts the inside face of the tape to either eliminate contact that would otherwise occur between the inside face of the tape and a portion of the tape cassette, or to reduce contact that would otherwise occur between the inside face of the tape and a portion of the tape cassette. The method is further characterized by moving a head block assembly member, that is either the magnetic head, or the first tape guide, or both into the access to contact an outside face of the tape to prevent contact between the outside face of the tape and the cassette.

What is claimed is:

1. An apparatus for processing a tape extending between a supply reel and a take-up reel of a cassette, the tape extending across an exposed access well located in a fixed processing edge of a body of the cassette, the access well providing access to the tape, the reels being rotatable about respective reel drive axes to transport the tape therebetween; the apparatus including:

(a) locators to locate the cassette in a pre-determined fixed position in the apparatus for processing the tape, (b) a tape engager for engaging a portion of the tape as it passes across the access well, the tape engager being elongated and parallel to the reel drive axes and being adapted to pass initially into at least one of a pair of transversely aligned lateral access openings provided in side walls associated with the access well without manipulating any portion of the cassette body, so that the tape engager can extend at least partially across the well, the tape engager having a portion remaining continuously within the said at least one lateral access opening so as to be closely and fully enclosed thereby and being stationary when the tape is being transported between the reels, the tape engager having a contact face which can extend outwardly to contact an inside face of the tape extending initially as a generally straight line across the well in an initial undisturbed position, so as to engage a portion of the tape in the undisturbed position, and (c) a movable head block assembly member, and means for mounting and moving the said member to approach the access well to contact an outside face of a portion of the tape generally adjacent the tape engager, the head block assembly member being positionable to approach the access well sufficiently to contact the tape adjacent the tape engager to prevent undesirable contact between the outside face of the tape and the cassette.

2. An apparatus as claimed in claim 1, in which:

(a) the head block assembly member that contacts the tape to prevent the said contact of the outside face of the tape with the cassette is a magnetic head.

3. An apparatus as claimed in claim 1, in which:

(a) the head block assembly member that contacts the tape to prevent the said contact of the outside face of the tape with the cassette is a tape guide.

4. An apparatus as claimed in claim 1, in which:

(a) the tape engager is shaped to facilitate contact with the undisturbed length of tape extending in the initial position thereof across the well as the cassette is inserted into the apparatus prior to displacing the tape to a displaced position.

5. An apparatus as claimed in claim 4, in which:

(a) the contact face of the tape engager is inclined outwardly and is shaped to displace a portion of the tape outwardly of the well as the cassette is approaching the predetermined position in the apparatus.

6. An apparatus as claimed in claim 1, in which:

(a) the tape engager has an outer end portion having a contact face inclined obliquely to the reel drive axes and located inwardly of an inner face of an undisturbed length of tape as the cassette is inserted into the apparatus, and (b) the tape engager has an inner end portion having the contact face which is disposed parallel to the reel drive axes and located outwardly of an outer face of the undisturbed length of tape when the cassette is in the predetermined position, the contact faces of the inner and outer portions of the tape engager merging smoothly together without a step.

7. An apparatus as claimed in claim 1, in which:

(a) the tape engager is fixed with respect to the locators.

8. An apparatus as claimed in claim 7, in which the tape engager has a longitudinally extending, outwardly facing tape contact portion, the tape contact portion comprising:

(a) an outer end portion having a contact face inclined obliquely to the reel axes and located inwardly of the inside face of an undisturbed length of tape extending in an initial position thereof as the cassette is inserted into the apparatus, and (b) an inner end portion having a contact face disposed parallel to the reel axes and located outwardly of the inside face of the undisturbed length of tape when the cassette is in the predetermined position, the contact faces of the inner and outer portions of the tape engager merging smoothly together without a step.

9. An apparatus as claimed in claim 8, in which the tape engager further comprises:

(a) a tape guidance portion which is positioned clear of the contact portion so as to be cleared by the tape during insertion and removal of the cassette from the apparatus, and to be engaged by the tape when the tape is displaced by the magnetic head during processing.

10. An apparatus as claimed in claim 8, in which:

(a) the tape guidance portion serves as a tape guide and is integral with the tape engager and has upper and lower edge guides which are spaced apart along the tape engager and are generally parallel to each other and positioned to receive the tape passing therebetween.

11. An apparatus as claimed in claim 7 in which:

(a) the tape engager is shaped to engage an edge portion of the said one of the lateral access openings to serve as a locator to locate the cassette body in the predetermined position.

12. An apparatus as claimed in claim 1, in which:

(a) the tape engager is movable with respect to the locators to displace the tape.

13. An apparatus as claimed in claim 12, in which the tape engager has:

(a) a body portion having a length less than inner spacing between opposing faces of side walls of the well to permit location of the body portion between the side wall of the well, and a transverse cross-sectional area smaller than the transversely aligned lateral access openings of the cassette body so as to pass therethrough, and (b) a support portion which is smaller in transverse cross-sectional area than the transverse cross-sectional of the body portion of the tape engager.

14. An apparatus as claimed in claim 1, in which:
(a) the tape engager is movable between a fully retracted position alignable with the said transversely aligned lateral access openings to permit insertion of the cassette into the apparatus, and a fully extended position in which a contact surface of the tape engager moves outwardly of a periphery of the lateral access opening to displace a portion of the tape to a displaced position to be contacted by the magnetic head.

15. An apparatus as claimed in claim 14, in which:
(a) the tape engager is mounted for rotation about an engager axis extending through the tape engager and being disposed generally parallel to the reel drive axis.

16. An apparatus as claimed in claim 15, in which:
(a) the engager axis passes through the transversely aligned access openings.

17. An apparatus as claimed in claim 15, in which:
(a) in the fully extended position of the tape engager, the tape is pinched between the tape engager and the magnetic head.

18. An apparatus as claimed in claim 17, in which:
(a) the tape engager has a generally concave surface to receive the magnetic head therein to increase wrap of the tape around the magnetic head, and
(b) a pressure pad is located on the contact surface and adapted to contact the tape.

19. An apparatus as claimed in claim 14, in which:
(a) the tape engager is mounted for rotation about an engager axis which is generally parallel to the reel drive axes and is disposed remotely from the transversely aligned Access openings.

20. An apparatus in claim 19 in which:
(a) spacing between the engager axis and an axis of the transversely aligned lateral access openings is at least several times greater than spacing between the fully extended and fully retracted positions of the tape engager so that the tape engager moves in an essentially straight line during rotation of the tape engager about the engager axis.

21. An apparatus as claimed in claim 14, in which:
(a) the tape engager is mounted to move along an essentially linear axis which intersects a transverse axis passing through the aligned access openings.

22. An apparatus as claimed in claim 1, in which:
(a) the tape engager has a guide surface which is located to be clear of the tape during insertion and removal of the cassette from the apparatus, and is adapted to contact the inside face of the tape when the head block assembly member engages the outside face of the tape to align the tape while processing.

23. An apparatus as claimed in claim 22, in which:
(a) the guide surface of the tape engager has upper and lower edge guides which are spaced apart along the tape engager and are generally parallel to each other and positioned to receive the tape passing therebetween.

24. A method of transporting and scanning a tape extending between a supply reel and a take-up reel of tape cassette, the tape cassette having a cassette body, at least one exposed access well located in a fixed processing edge of the cassette body to provide access to the tape, and a pair of transversely aligned lateral access openings in side walls of the cassette body associated with said well; the method comprising the steps of:
(a) while the cassette is being located in a predetermined fixed position in the apparatus for transporting and scanning the tape, and without manipulating any portion of the cassette body to provide access thereto, causing a tape engager to pass into at least one of the lateral access openings of the pair of transversely aligned access openings to extend at least partially across the access well so that the tape engager approaches an inside face of a portion of tape extending in an initial undisturbed position thereof as a generally straight line across the access well,
(b) engaging a portion of the tape with the tape engager,
(c) moving a head block assembly member to approach the access well sufficiently to contact an outside face of the tape adjacent the tape engager to prevent undesirable contact between the outside face of the tape and the cassette, and
(d) maintaining a portion of the tape engager continuously within the said at least one lateral access opening so as to be closely and fully enclosed thereby and stationary when the tape is being transported between the reels.

25. A method as claimed in claim 24, further characterised by:
(a) displacing the tape with the tape engager from the initial undisturbed position of the tape extending across the well as the cassette is moved into the predetermined position.

26. A method as claimed in claim 25, further characterised by:
(a) the tape engager remaining in a fixed position throughout.

27. A method as claimed in claim 24, further characterised by:
(a) positioning an outer end portion of the tape engager adjacent an inner face of an undisturbed length of tape extending in the initial undisturbed position thereof across the well, and
(b) displacing the tape outwardly from the initial position thereof by causing relative movement between an obliquely inclined surface of the tape engager and the shifted portion of the tape.

28. A method as claimed in claim 24, further characterised by:
(a) locating a contact surface of the tape engager in a retracted position so as to pass into the access openings, and
(b) moving the contact surface of the tape engager outwardly from the cassette well to displace the tape from the initial position thereof to a displaced position thereof.

29. A method as claimed in claim 28, further characterised by:
(a) moving the contact surface of the tape engager by rotating the contact surface about an engager axis disposed parallel to the reel axes.

30. A method as claimed in claim 29, further characterised by:
(a) rotating the contact surface about the engager axis which also passes through the aligned access openings.

31. A method as claimed in claim 29, further characterised by:
(a) rotating the contact surface about the engager axis which is disposed remotely from the aligned access openings.

32. A method as claimed in claim 24, further characterised by:
(a) moving the contact surface along an essentially linear axis which intersects a transverse axis passing through the aligned access openings.

33. A method as claimed in claim 24, further comprising:

(a) aligning the tape with a guide surface located on the tape engager during processing of the tape.

34. A method as claimed in claim 33, further characterised by:

(a) during insertion and removal of the cassette, maintaining the guide surface in a location relative to the cassette in which the guide surface is clear of the tape, so as to avoid interference therewith during said insertion and removal.

35. An apparatus for processing a tape extending between a supply reel and a take-up reel of a cassette, the tape extending across an exposed access well located in a fixed processing edge of a body of the cassette, the access well providing access to the tape, the reels being rotatable about respective reel drive axes to transport the tape therebetween; the apparatus including:

(a) locators to locate the cassette in a pre-determined position in the apparatus for processing the tape, (b) a movable head block assembly member and means for mounting and moving the member into the access well to contact an outside face of a portion of the tape extending across the well, and (c) a tape engager for engaging a portion of the tape adjacent the head block assembly member, the tape engager being elongated and parallel to the reel drive axes and being adapted to pass initially into at least one of a pair of transversely aligned lateral access openings provided in side walls associated with the access well without manipulating any portion of the cassette body so that the tape engager can extend at least partially across the access well, the tape engager having a portion remaining continuously within the said at least one lateral access opening so as to be closely and fully enclosed thereby and being stationary when the tape is being transported between the reels, the tape engager having a guide surface which is located to be clear of the tape during insertion and removal of the cassette from the apparatus, and to contact the inside face of the tape extending initially as a generally straight line across the well in an initial undisturbed position, so as to engage a portion of the tape in the undisturbed position, so that the head block assembly member contacts the outside of the tape to prevent contact between the outside face of the tape and cassette so as to align the tape while processing.

36. An apparatus as claimed in claim 35, in which:

(a) the member of the head block assembly that contacts the tape to prevent the said contact is a magnetic head.

37. An apparatus as claimed in claim 35, in which:

(a) the member of the head block assembly that contacts the tape to prevent the said contact is a tape guide.

38. An apparatus as claimed in claim 35, in which:

(a) the tape guidance portion serves as a tape guide and is integral with the tape engager and has upper and lower edge guides which are spaced apart along the tape engager and are generally parallel to each other and positioned to receive the tape passing therebetween.

39. A method of transporting and scanning a tape extending between a supply reel and a take-up reel of a tape cassette, the tape cassette having a cassette body, at least one exposed access well located in a fixed processing edge of the cassette body to provide access to the tape, and a pair of transversely aligned lateral access openings in side walls of the cassette body associated with said access well; the method comprising the steps of:

(a) causing a tape engager to pass into at least one of the openings of the pair of transversely aligned lateral access openings to extend at least partially across the access well without manipulating any portion of the cassette body so that the tape engager approaches an inside face of a portion of tape extending in an initial undisturbed position thereof as a generally straight line across the access well as the cassette is located in a predetermined position in the apparatus, (b) moving a head block assembly member into the access well sufficiently to contact an outside face of the tape adjacent the tape engager to prevent undesirable contact between the outside face of the tape and the cassette, and (c) maintaining a portion of the tape engager continuously within the said at least one lateral access opening so as to be closely and fully enclosed thereby and stationary when the tape is being transported between the reels, and contacting the inside face of the tape and engaging edges of the tape with the tape engager to guide the tape relative to the head block assembly member.

* * * * *